United States Patent
LaCross et al.

(10) Patent No.: US 12,023,981 B2
(45) Date of Patent: Jul. 2, 2024

(54) QUAD ZONE BOOSTER INTAKE LPM COOLING ASSEMBLY

(71) Applicant: Hanon Systems, Daejeon (KR)

(72) Inventors: Travis LaCross, Royal Oak, MI (US); Jayanthi Iyer, Northville, MI (US); Steve M. Kahrs, Canton, MI (US); Ian Lewczynski, Plymouth, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/814,357

(22) Filed: Jul. 22, 2022

(65) Prior Publication Data
US 2024/0025223 A1 Jan. 25, 2024

(51) Int. Cl.
*B60H 1/00* (2006.01)
(52) U.S. Cl.
CPC ..... *B60H 1/00071* (2013.01); *B60H 1/00028* (2013.01); *B60H 2001/00107* (2013.01)
(58) Field of Classification Search
CPC ............ B60H 1/00271; B60H 1/00521; B60H 1/00528; B60H 1/00564; B60H 2001/00092; B60H 2001/00107; B60H 2001/00185; B60H 2001/00192; B60H 2001/002; B60H 2001/003; B60H 2001/00614; B60H 1/00547; B60H 2001/00242; B60H 1/244
See application file for complete search history.

(56) References Cited

U.S. PATENT DOCUMENTS

| | | | | |
|---|---|---|---|---|
| 4,742,864 A | * | 5/1988 | Duell | H05K 7/20145 165/47 |
| 4,955,203 A | * | 9/1990 | Sundhar | F25B 21/02 62/235.1 |
| 5,481,885 A | * | 1/1996 | Xavier | B60K 37/00 62/244 |
| 5,669,813 A | * | 9/1997 | Jairazbhoy | B60H 1/00271 361/645 |
| 6,318,103 B1 | * | 11/2001 | Rieger | B60H 1/00521 62/239 |
| 6,692,130 B1 | * | 2/2004 | Snow | B60H 1/00428 454/900 |

(Continued)

FOREIGN PATENT DOCUMENTS

CN 113557398 A 10/2021
DE 4206611 A1 * 9/1992
(Continued)

*Primary Examiner* — Jenna M Maroney
(74) *Attorney, Agent, or Firm* — Shumaker, Loop & Kendrick, LLP; James D. Miller

(57) ABSTRACT

An air-handling system for a vehicle includes a housing defining a first flow path through which a first flow of air is configured to selectively flow and a second flow path through which a second flow of air is configured to selectively flow. A heat exchange passageway provides fluid communication between the first flow path and the second flow path within the housing. A heat sink is disposed within the heat exchange passageway and is associated with cooling a linear power module of a blower assembly disposed within the housing. The heat sink is configured to exchange heat with air disposed within the heat exchange passageway to provide cooling of the linear power module regardless of a mode of operation of the blower assembly.

20 Claims, 4 Drawing Sheets

(56) References Cited

U.S. PATENT DOCUMENTS

| | | | | |
|---|---|---|---|---|
| 7,654,351 B2* | 2/2010 | Koike | | H01M 50/278 180/68.5 |
| 7,866,164 B2* | 1/2011 | Rice | | B60H 1/00478 62/259.3 |
| 8,016,063 B2* | 9/2011 | Tsuchiya | | B60K 1/04 180/68.5 |
| 9,966,640 B2* | 5/2018 | Kumagai | | B60L 58/26 |
| 10,399,455 B2* | 9/2019 | Sugitate | | H01M 10/615 |
| 2002/0150478 A1* | 10/2002 | Aoki | | F04D 17/10 417/44.1 |
| 2004/0074248 A1* | 4/2004 | Tanaka | | B60H 1/00514 62/244 |
| 2005/0178128 A1* | 8/2005 | Harwood | | B60H 1/00478 62/3.61 |
| 2007/0000231 A1* | 1/2007 | Otsuka | | B60H 1/248 60/203.1 |
| 2010/0154468 A1* | 6/2010 | Shaska | | B60H 1/00514 165/104.31 |
| 2010/0231035 A1* | 9/2010 | Tsuchiya | | B60H 1/00285 307/9.1 |
| 2013/0156554 A1* | 6/2013 | Thawani | | F04D 29/5806 415/178 |
| 2015/0283876 A1* | 10/2015 | Froehling | | B60H 1/00057 165/121 |
| 2016/0096411 A1* | 4/2016 | Eisenhour | | B60H 1/00428 165/42 |
| 2017/0248147 A1* | 8/2017 | Ueda | | F04D 17/16 |
| 2018/0105013 A1* | 4/2018 | Sakakibara | | B60H 1/00521 |
| 2020/0376926 A1* | 12/2020 | Nishiyama | | B60H 1/00778 |
| 2021/0031587 A1* | 2/2021 | Barat | | F04D 27/004 |
| 2021/0162835 A1* | 6/2021 | Hyatt | | B60H 1/00564 |
| 2021/0185862 A1* | 6/2021 | Nagao | | H05K 7/20863 |
| 2022/0332171 A1* | 10/2022 | Greber | | B60N 2/5628 |
| 2024/0025223 A1* | 1/2024 | LaCross | | B60H 1/00071 |

FOREIGN PATENT DOCUMENTS

| | | | | |
|---|---|---|---|---|
| DE | 102021122866 A1 | * | 3/2023 | B60H 1/00564 |
| FR | 2931731 A1 | * | 12/2009 | B60H 1/00278 |
| FR | 3056946 A1 | * | 4/2018 | B60H 1/00592 |
| JP | H05229333 A | | 9/1993 | |
| JP | 6562156 B2 | | 8/2019 | |
| JP | 2020019352 A | | 2/2020 | |
| KR | 900006090 B1 | * | 8/1990 | |
| KR | 19990032369 U | | 7/1999 | |
| KR | 100878513 B1 | * | 1/2009 | |
| KR | 20090075985 A | | 7/2009 | |
| KR | 20110089578 A | * | 8/2011 | |
| KR | 20120110891 A | * | 10/2012 | |
| KR | 101659868 B1 | | 9/2016 | |
| KR | 20180029128 A | | 3/2018 | |

* cited by examiner

QUAD ZONE BOOSTER INTAKE LPM COOLING ASSEMBLY

FIELD OF THE INVENTION

The invention relates generally to a heating, ventilating, and air conditioning (HVAC) air-handling system for a motor vehicle, and more particularly, to a housing of the air-handling system having a heat exchange passageway for cooling a heat sink associated with two independent flow paths formed within the housing.

BACKGROUND

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a housing having a plurality of conduits and doors for selectively controlling a flow of air to various vents within the passenger compartment of the vehicle, depending on an operating mode selected by a vehicle occupant. Each operating mode includes a preselected percentage of the air originating from a mixing chamber delivered to each of the corresponding vents associated with the selected operating mode. The vents may include panel vents, console vents, front floor vents, rear floor vents, windshield defrost vents, and side window defrost vents, for example.

It has become increasingly common for such air-handling systems to provide a feature wherein the passengers of the motor vehicle can select different air-conditioning settings with respect to two or more different zones within the passenger compartment of the vehicle. For example, many vehicles include independent temperature control for the left and right sides of the passenger compartment, for the front and rear seat zones of the passenger compartment, and for combinations thereof, as desired.

The ability to independently control the condition of the air delivered to multiple such zones may necessitate the use of an auxiliary blower or fan for ensuring that the air delivered to certain vents has a suitable pressure for achieving a desired flow rate out of those vents. This is especially true when independent control is provided with respect to a rearward (or other distant) region of the passenger compartment, such a region of the passenger compartment associated with the rear seat passengers of the associated vehicle, due to the relatively long flow path of the air through the HVAC air-handling system when delivered to such a distant region.

The auxiliary blower or fan utilized in such a circumstance may be electrically powered by a suitable power source for providing the necessary flow rate of the air through the corresponding flow path or paths. The blower or fan may be associated with a linear power module (LPM) for dropping an alternating current (AC) voltage provided by a power source, and then converting the AC voltage to a suitable direct current (DC) voltage suitable for use with the blower or fan. Such an LPM may utilize a fixed amount of power that is variably provided for powering the blower or fan based on the desired air flow rate through the blower or fan. This fixed amount of power leads to a circumstance wherein any power not utilized by the LPM for powering the operation of the blower or fan must be accounted for in the form of waste heat that is generated by electrical resistance associated with the LPM. As such, an increase in the demands placed on the blower or fan may lead to a reduction in the waste heat generated by the LPM, whereas a reduction in the demands placed on the blower or fan may lead to an increase in the waste heat generated by the LPM. The constant generation of the variable waste heat by the LPM during operation of the vehicle requires the use of a heat sink for ensuring that the LPM does not overheat during extended use thereof.

The LPM heat sink for such an auxiliary blower or fan may be cooled via the stream of the air to be delivered to the distant region of the vehicle via the HVAC air-handling system, such as the described rear passenger region. It has been discovered that the LPM heat sink can be cooled adequately via the use of a relatively low flow rate of the conditioned air thereover. This is achievable because the amount of heat generated by the LPM is relatively low such that the LPM heat sink does not require positioning directly within the corresponding flow path of the air stream to achieve the necessary degree of heat exchange, which also leads to the LPM heat sink having a negligible effect on the temperature of the air stream passing thereby via heat exchange between the air stream and the heat sink.

It is therefore desirable to position the LPM heat sink such that a minimal distribution of the air delivered to the distant region of the vehicle directly encounters the LPM heat sink when passing thereby, thereby limiting the pressure drop experienced where the air passes over the LPM heat sink while also achieving desirable cooling. This may be achieved by positioning the LPM heat sink in a compartment, indentation, or the like that is disposed laterally of the most direct flow path of the air through the corresponding flow path such that the LPM heat sink is constantly in fluid and heat exchange communication with the air stream while not presenting an undesirable obstruction thereto.

In some circumstances, the HVAC air-handling system may include the division of the air delivered to the distant region into two segregated and independently controlled air streams. For example, a quad zone system may include a first zone associated with the front driver side of the vehicle, a second zone associated with the front passenger side of the vehicle, a third zone associated with the rear driver side of the vehicle, and a fourth zone associated with a rear passenger side of the vehicle, wherein the third and fourth zones are each associated with such a distant region in need of an auxiliary blower or fan. Such an HVAC air-handling system may include the associated housing thereof defining a pair of rearward extending flow paths associated with the described third and fourth zones.

The use of two different flow paths towards such a distant (rear) region results in a difficulty in packaging the associated LPM heat sink for ensuring the continual and desired degree of cooling thereof. For example, it is undesirable to position the LPM heat sink for fluid and heat exchange communication within only one of the two flow paths due to the possibility that the flow path having the LPM heat sink may optionally be rendered inactive (via a passenger vent or fan adjustment) while use of the other flow path is actively requested, which results in a demand being placed on the associated auxiliary blower or fan without the ability to pass a desired air flow over the LPM heat sink. The biasing of the LPM heat sink to one of the two flow paths also undesirable presents a difference between the flow conditions within each of the distinct flow paths, which must be accounted for in attempting to create similar conditions between the two flow paths based on the user-selected settings. As another example, it may also be undesirable to place the LPM heat sink at a position for fluid and heat exchange communication with each of the two distinct flow paths, such as a position for spanning portions of each of the flow paths, as only limited configurations of the corresponding HVAC air-handling system housing may achieve such a positioning of the LPM heat sink relative to the two flow paths while minimizing the flow obstruction provided by the LPM heat sink, which in turn may interfere with the packaging of adjacent components of the vehicle. Such spanning of the flow paths by the LPM heat sink also leads to a condition wherein only half of the LPM heat sink encounters the air flow under certain conditions (such as those mentioned above when different settings are selected among the two flow paths), hence such a configuration may not achieve the desired degree of heat exchange.

Accordingly, there exists a need in the art for an HVAC air-handling system with a reduced packaging size configured to cool a corresponding LPM heat sink while also providing independent temperature control to multiple zones of the passenger compartment.

SUMMARY OF THE INVENTION

In accordance and attuned with the present invention, an air-handling system having a heat exchange passageway for promoting desired cooling of a heat sink associated with two flow paths has surprisingly been discovered, wherein the heat exchange passageway minimizes cross-flow between the two flow paths.

According to an embodiment of the present invention, an air-handling system for a vehicle includes a housing defining a first flow path through which a first flow of air is configured to selectively flow and a second flow path through which a second flow of air is configured to selectively flow. A heat exchange passageway provides fluid communication between the first flow path and the second flow path within the housing. A heat sink is disposed within the heat exchange passageway and is associated with cooling a linear power module of a blower assembly disposed within the housing. The heat sink is configured to exchange heat with air disposed within the heat exchange passageway to provide cooling of the linear power module regardless of a mode of operation of the blower assembly.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

Figure 1:
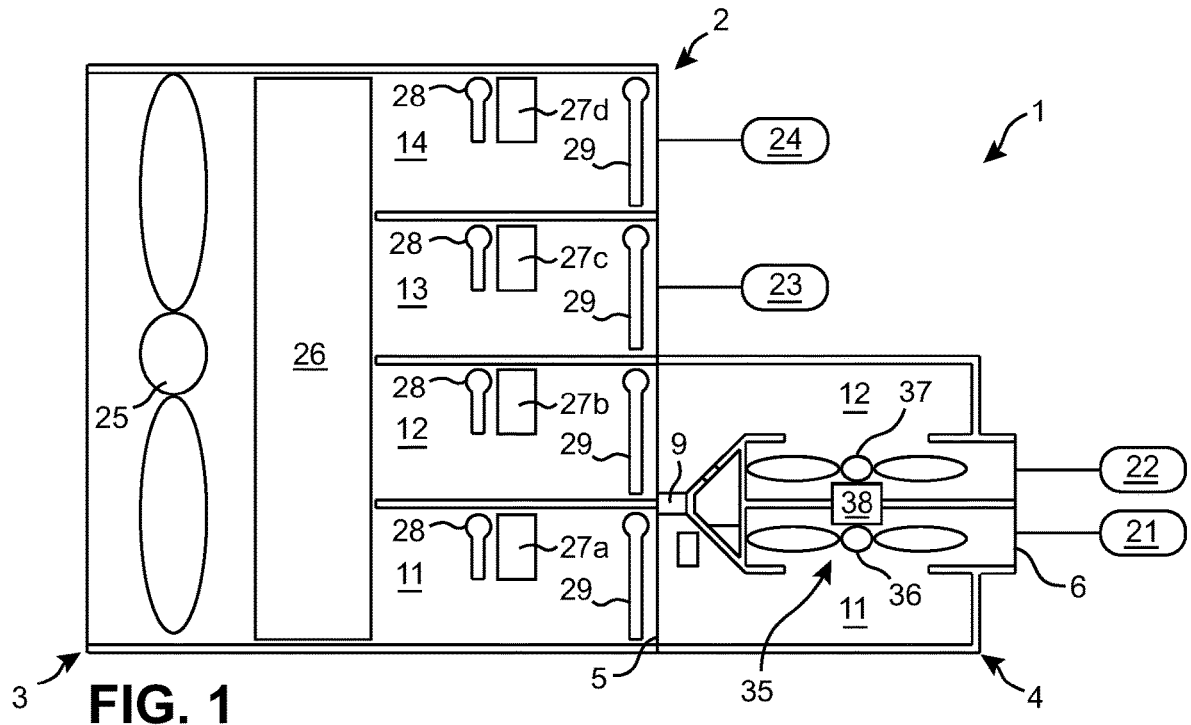
FIG. 1 is a schematic view of an air-handling system having a rear housing with a heat exchange passageway according to an embodiment of the present invention.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a similar fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, zones, and/or sections, these elements, components, regions, zones, and/or sections should not be limited by these terms. These terms may be only used to distinguish one element, component, region, zone, or section from another element, component, region, zone, or section. Terms such as "first," "second," and other numerical terms when used herein do not imply a sequence or order unless clearly indicated by the context. Thus, a first element, component, region, zone, or section discussed below could be termed a second element, component, region, zone, or section without departing from the teachings of the example embodiments.

The present invention relates to an air-handling system 1 of a heating, ventilating, and air conditioning (HVAC) system or climate control system for a vehicle (not shown) according to an embodiment of the present disclosure. The air-handling system 1 typically provides heating, ventilation, and air conditioning for a passenger compartment (not shown) of the vehicle. The passenger compartment may be divided into a plurality of different zones, such as a front seat zone and a rear seat zone. The air directed to the front seat zone may be directed through various different dedicated vents, including windshield or side window defrost vents, panel vents, or floor vents. The air directed to the rear seat zone may also be directed through various different dedicated vents, including panel vents and floor vents. The front seat zone and the rear seat zone may each be further subdivided into left and right zones (driver side and passenger side zones), as desired.

The air-handling system 1 may accordingly be configured to provide for independent flow and temperature control of the air with respect to at least two different zones of the passenger compartment. Specifically, the air-handling system 1 may be configured to provide at least one of dual zone control, tri-zone control, or quad-zone control. The dual zone control may include independent control of the air directed to each of the front seat zone and the rear seat zone, as desired, or independent control of each of the driver side or the passenger side of the vehicle. The tri-zone control may include the division of the front seat zone into driver side and passenger side zones to allow for independent control of the air directed to each of the front seat driver side zone, the front seat passenger side zone, and a single common rear seat zone. The quad-zone control may further include the division of the rear seat zone into driver side and passenger side zones to allow for independent control of the air directed to each of the front seat driver side zone, the front seat passenger side zone, the rear seat driver side zone, and the rear seat passenger side zone. Each described zone may be associated with a dedicated set of the vents in fluid communication with the passenger compartment, wherein the different zones can be differentiated from one another by a determination of which of the dedicated vents are associated with the passage of the conditioned air for the selected operational mode of the air-handling system 1.

FIG. 1 illustrates an exemplary quad-zone air-handling system 1 having a heat sink cooling feature according to an embodiment of the present invention. As explained hereinafter, the air-handling system 1 is shown primarily in schematic form in FIG. 1 to illustrate one potential circumstance and structural configuration in which the present heat sink cooling feature may be utilized, and is not to be considered limiting to the potential processes and structural configurations suitable for use with the present invention.

The air-handling system 1 includes a housing 2 that may be sub-divided into a primary housing 3 and a secondary housing 4. The primary housing 3 defines at least a portion of each of a first flow path 11, a second flow path 12, a third flow path 13, and a fourth flow path 14, each of which is associated with directing a different (partial) flow of air passing through the housing 2 to one of four different zones of an associated passenger compartment. The secondary housing 4 is coupled to the primary housing 3 and further defines a downstream-arranged portion of each of the first flow path 11 and the second flow path 12. As such, each of the first flow path 11 and the second flow path 12 span both the primary housing 3 and the secondary housing 4, whereas the third flow path 13 and the fourth flow path 14 do not pass through and are not defined by any portion of the secondary housing 4.

The first flow path 11 is configured to direct the flow of air therethrough to at least one vent 21 associated with a first zone of the passenger compartment, the second flow path 12 is configured to direct the flow of air therethrough to at least one vent 22 associated with a second zone of the passenger compartment, the third flow path 13 is configured to direct the flow of air therethrough to at least one vent 23 associated with a third zone of the passenger compartment, and the fourth flow path 14 is configured to direct the flow of air therethrough to at least one vent 24 associated with a fourth zone of the passenger compartment. The air-handling system 1 may further include any necessary ducts or conduits to convey each flow of air to the position of each of the associated vents 21, 22, 23, 24, as necessary. In the present example, the first zone may be a rear seat driver side zone, the second zone may be a rear seat passenger side zone, the third zone may be a front seat driver side zone, and the fourth zone may be a front seat passenger side zone. However, any combination of zones associated with any combination of different regions of an associated vehicle may be utilized in conjunction with the present invention while remaining within the scope of the present invention.

The primary housing 3, which may alternatively be referred to as a first housing or front housing of the air-handling system 1, may typically be arranged towards a front end of the associated vehicle at a position adjacent a dashboard of the vehicle. The secondary housing 4, which may alternatively be referred to a second housing or rear housing of the air-handling system 1, may typically be arranged rearwardly of the primary housing 3, such as extending rearwardly from the primary housing 3 adjacent a center console arranged between a front driver seat and a front passenger seat of the vehicle. The secondary housing 4 may accordingly be utilized to extend the first and second flow paths 11, 12 towards the associated zones and corresponding vents 21, 22 that are spaced apart from the primary housing 3. The use of the secondary housing 4 may accordingly be associated with the first and second flow paths 11, 12 being longer than the third and fourth flow paths 13, 14 with respect to a distance traveled by the corresponding flows of air, thereby resulting in a potential for a greater pressure loss to be experienced by the flows of air progressing towards the zones associated with the vents 21, 22. Such a difference in pressure loss must accordingly be accounted for in ensuring that similar flow conditions are attainable with respect to each of the different zones and sets of vents 21, 22, 23, 24.

The primary housing 3 may include the components and structure necessary for independently conditioning the flow of air through each respective flow path 11, 12, 13, 14, and may be said to include a conditioning section of each of the flow paths 11, 12, 13, 14. In the illustrated embodiment, an upstream end of the primary housing 3 includes an upstream or primary blower assembly 25 configured to promote the flow of the air through each of the different flow paths 11, 12, 13, 14 within the primary housing 3 for initiating the independent conditioning of each respective flow of air. The primary blower assembly 25 may receive ambient air, air recirculated from the passenger compartment, or combinations thereof, as desired. An evaporator 26 may be arranged within the primary housing 3 at a position wherein the evaporator 26 extends across at least a portion of the flow area of each of the independent flow paths 11, 12, 13, 14, such as being disposed at the entrance into each of the flow paths 11, 12, 13, 14. Each of the different flow paths 11, 12, 13, 14 further includes a respective heater core segment 27a, 27b, 27c, 27d, wherein each of the heater core segments 27a, 27b, 27c, 27d extends across a portion of each corresponding flow path 11, 12, 13, 14. The heater core segments 27a, 27b, 27c, 27d may be representative of segments of a single heating element or structure disposed to extend at least partially into or across each of the flow paths 11, 12, 13, 14. Although the flow paths 11, 12, 13, 14 are depicted as being arranged substantially side-by-side in the schematic representation of FIG. 1, it should be understood that the flow paths 11, 12, 13, 14 may actually be arranged in a stacked configuration wherein the third and fourth flow paths 13, 14 are stacked vertically above the first and second flow paths 11, 12 for forming four quadrants within the primary housing 3, and features such as the evaporator 26 and the heating structure associated with the heater core segments 27a, 27b, 27c, 27d may be arranged to extend entirely or partially across each of the four quadrants.

Each of the flow paths 11, 12, 13, 14 may include one or more temperature control doors 28 for determining a distribution of the flow of the air through each of the respective heater core segments 27a, 27b, 27c, 27d in prescribing the conditions of each flow of air in accordance with the passenger selected settings for each zone and each respective sets of vents 21, 22, 23, 24. Each of the flow paths 11, 12, 13, 14 may further include any number of mode control or distribution control doors 29 for closing off or opening up flow to a specific zone and the associated vents 21, 22, 23, 24, or otherwise for distributing the flow through each of the flow paths 11, 12, 13, 14 among those vents 21, 22, 23, 24 associated with each respective flow path 11, 12, 13, 14.

The secondary housing 4 further includes a secondary blower assembly 35 for adding pressure to the flow of air passing through each of the first flow path 11 and the second flow path 12 at a position remote from the primary blower assembly 25. The secondary blower assembly 35 may alternatively be referred to as an auxiliary blower assembly, by virtue of the supplemental nature of the additional air pressure utilized in creating a desired flow rate at each of the associated sets of vents 21, 22. The secondary blow assembly 35 is shown as including a first blower wheel 36 configured to add pressure to the flow of air passing through the first flow path 11 as well as a second blower wheel 37 configured to add pressure to the flow of air passing through the second flow path 12. Each of the blower wheels 36, 37 is driven by at least one actuator 38. The at least one actuator 38 may be configured to rotate each of the blower wheels 36, 37 independently of each other and at variable rotational rates, thereby prescribing a desired flow rate through each of the respective flow paths 11, 12.

Figure 3:
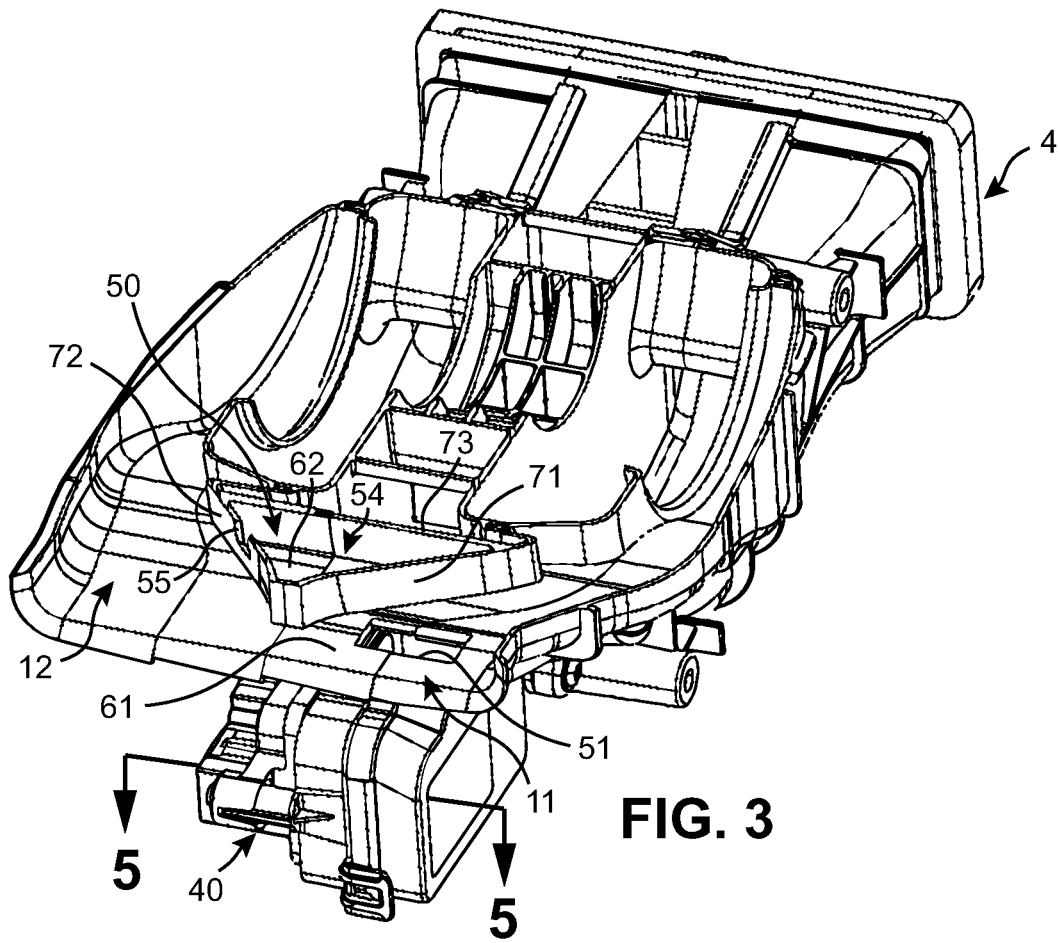
FIG. 3 is perspective cross-sectional view of the rear housing of FIG. 2 with the illustrated cross-section taken from the perspective of section lines 3-3 in FIG. 2.

The at least one actuator 38 of the secondary blower assembly 35 may be associated with and in electrical communication with an LPM 40 (identified in FIGS. 3-5) for adjusting a current utilized in powering the at least one actuator 38, as explained in greater detail when describing the background of the present invention. The LPM 40 is configured to generate heat during operation of the secondary blower assembly 35, wherein such heat is generated variably as waste heat depending on the amount of power necessary to rotate one or both of the blower wheels 36, 37. The LPM 40 accordingly generates some amount of waste heat even when only one of the blower wheels 36, 37 is required for causing a flow of air through one of the flow paths 11, 12.

The uninterrupted generation of waste heat by the LPM 40 during operation of either or both of the blower wheels 36, 37 results in the need for a dedicated heat sink 42 for removing heat from the LPM 40 in order to prevent an overheating thereof. The secondary housing 4 accordingly includes a heat exchange passageway 50 in which the heat sink 42 is disposed, wherein the heat exchange passageway 50 provides fluid communication between the first flow path 11 and the second flow path 12 within the secondary housing 4. As explained hereinafter, the heat exchange passageway 50 is configured to beneficially allow for a desired degree of heat exchange to occur between the heat sink 42 and the air passing through the secondary housing 4, regardless of which of the flow paths 11, 12 is currently conveying a flow of air therethrough based on the instantaneous operational state of each of the blower wheels 36, 37. The heat exchange passageway 50 is also configured to cause a minimal disturbance to the flow of the air through either of the flow paths 11, 12 by extending outside of the flow area of each of the flow paths 11, 12, which results in a minimized pressure drop being experienced by the air passing through each of the flow paths 11, 12. Lastly, the positioning and configuration of the heat exchange passageway 50 ensures that each of the flows of air passing through one of the flow paths 11, 12 is not undesirably affected by the need to cool the heat sink 42.

The heat exchange passageway 50 includes a first window 51, a first compartment 52, a connecting passage 53, a second compartment 54, and a second window 55, each of which are provided as hollow openings defined by corresponding surfaces of the secondary housing 4. The first window 51 provides fluid communication between the first flow path 11 and the first compartment 52, the first compartment 52 provides fluid communication between the first window 51 and the connecting passage 53, the connecting passage 53 provides fluid communication between the first compartment 52 and the second compai linent 54, the second compartment 54 provides fluid communication between the connecting passage 53 and the second window 55, and the second window 55 provides fluid communication between the second compartment 54 and the second flow path 12. The heat exchange passageway 50 does not include any additional inlets or outlets beyond the disclosed first window 51 and second window 52, and hence air only enters or exits the heat exchange passageway 50 via entry or exit through one of the windows 51, 52. As such, only air originating (at some point in time) from one of the flow paths 11, 12 formed through the secondary housing 4 is able to be circulated through the heat exchange passageway 50 for exchanging heat with the heat sink 42 of the LPM 40.

Figure 2:
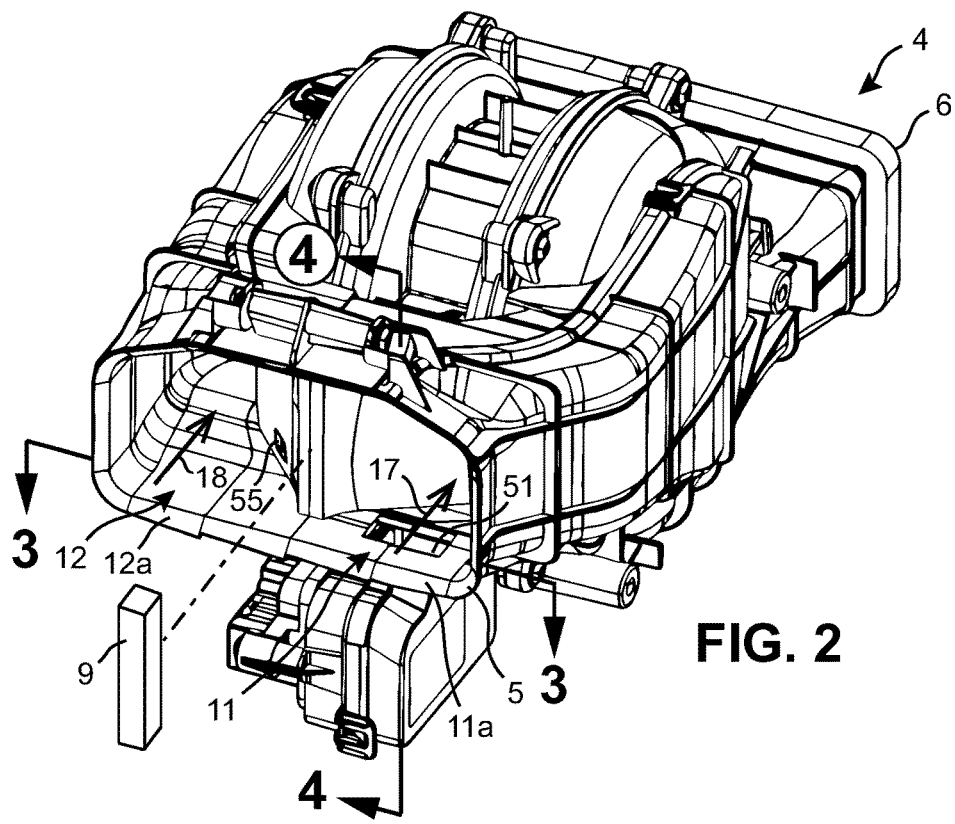
FIG. 2 is a perspective view of the rear housing shown in isolation.

The configuration of the heat exchange passageway 50 is described hereinafter with reference to a direction of a flow of the air passing through each of the respective flow paths 11, 12 when each of the flows of air first encounters and/or passes by the heat exchange passageway 50. For reference, each of FIGS. 2 and 6 includes an arrow 17 showing a general direction of flow of a first flow of air passing through the first flow path 11 when the first flow of air first encounters and/or passes by the first window 51, while each of FIGS. 2 and 7 includes an arrow 18 showing a general direction of flow of a second flow of air passing through the second flow path 12 when the second flow of air first encounters and/or passes by the second window 52. As shown, the directions of flow as indicated by the arrows 17, 18 may be substantially parallel to each other at the illustrated positions.

The directions of flow may also be described alternatively with respect to the disclosed configuration of the secondary housing 4. For example, each of the directions of flow may corresponding to a direction arranged perpendicular to a plane formed by a first end 5 of the secondary housing 4 where the flows of air first enter the secondary housing 4. As such, the direction of flow associated with the first flow path 11 may be said to be arranged perpendicular to a plane defining an inlet 11a into the first flow path 11 at the first end 5 of the secondary housing 4. Similarly, the direction of flow associated with the second flow path 12 may be said to be arranged perpendicular to a plane defining an inlet 12a into the second flow path 12 at the first end 5 of the secondary housing 4. Each of the illustrated directions of flow may also substantially coincide with a longitudinal direction of the secondary housing 4 as defined between the first end 5 and a downstream arranged second end 6 thereof, wherein the second end 6 forms an outlet 11b, 12b of each of the respective flow paths 11, 12.

For brevity and simplicity, each of the described directions of flow is referenced hereinafter as the direction of the corresponding arrow 17, 18, wherein it is understood that references to the arrow 17 refer to the first flow within the first flow path 11 while references to the arrow 18 refer to the second flow within the second flow path 12.

The secondary housing 4 is shown in FIGS. 2-5 wherein a vertical direction of the page corresponds to a vertical or height direction of the secondary housing 4. The vertical direction may be arranged perpendicular to the direction of extension of each of the arrows 17, 18. A lateral direction of the secondary housing 4 is arranged perpendicular to the vertical direction and corresponds to a lateral or width direction of the secondary housing 4 extending perpendicular to the longitudinal direction of the secondary housing 4 as defined between the opposing ends 5, 6 thereof. The lateral direction may also be arranged perpendicular to the direction of each of the arrows 17, 18. When installed within a corresponding vehicle, the downward vertical direction may be towards a ground surface on which the vehicle rests, the rightward lateral direction (from the perspective of FIG. 2) may be towards the driver side of the vehicle, the leftward lateral direction (again from the perspective of FIG. 2) may be towards the passenger side of the vehicle, and the longitudinal direction extending from the first end 5 to the second end 6 may be towards a rear of the vehicle, as one non-limiting configuration.

It should also be noted that the secondary housing 4 includes a segregation of each of the flows of air passing through the respective flow paths 11, 12 at the first end 5 of the secondary housing 4 despite the appearance of a flow opening at the described position. As shown in each of FIGS. 1 and 2, the first end 5 of the secondary housing 4 may include or otherwise receive a partitioning wall 9 at the first end 5 for separating each of the inlets 11a, 12a from one another, thereby providing segregation of the flows of air beyond each of the inlets 11a, 12a. The partitioning wall 9 is depicted in FIG. 1 as an extension of the primary housing 3 for compressing a sealing element (not shown) between the partitioning wall 9 and a corresponding surface of the secondary housing 4. However, the partitioning wall 9 may alternatively be provided as a portion of the secondary housing 4, and may be formed integrally with the adjacent walls defining each of the flow paths 11, 12, as desired. In any event, the present invention does not include fluid communication between the flow paths 11, 12 at any position within the secondary housing 4 that is upstream of the described heat exchange passageway 50.

The heat sink 42 is disposed within the first compartment 52 and comprises a plurality of spaced apart cylindrical structures extending between opposing sidewalls defining an interior of the first compartment 52. The cylindrical structures may extend from the LPM 40, which is shown as being positioned adjacent the first compartment 52 with respect to the lateral direction. However, the heat sink 42 may be formed from any structure or structures suitable for promoting the exchange of heat with a flow of air passing thereover, and is thus not limited to the illustrated configuration. The heat sink 42 may include any configuration suitable for exposing a desired surface area of the heat sink 42 to a flow of air for promoting a desired degree of heat exchange, including the use of fins or the like.

The first compartment 52 and the corresponding heat sink 42 are positioned within a portion of the secondary housing 4 extending vertically downward from a position of each of the inlets 11a, 12a into the flow paths 11, 12. The first compartment 52 may be biased laterally towards the first flow path 11 (driver side of the vehicle), whereas the adjacent LPM 40 may be biased towards the second flow path 12 (passenger side of the vehicle). The biasing of the first compartment 52 towards the first flow path 11 results in at least a portion of the first compartment 52 being arranged below and spaced apart from the first flow path 11 with respect to a direction arranged transverse to the direction of the arrow 17, which may correspond to the perpendicular arranged vertical direction. The first compartment 52 is at least partially defined by a first separating wall 61, which also defines at least a portion of the first flow path 11 adjacent the inlet 11a thereof. The first window 51 is formed through the first separating wall 61 and is arranged wherein a flow of the air passing between the first flow path 11 and the first compartment 52 flows in a direction transverse to the direction of the arrow 17. More specifically, the flow of air may flow in a direction perpendicular to the direction of the arrow 17, which may correspond to the vertical direction.

As is apparent from comparison of the views of FIGS. 2-5, the first window 51 has a smaller cross-sectional flow area therethrough than the first flow path 11 immediately adjacent the first window 51 or the first compartment 52 immediately adjacent the first window 51. A passage of air through the first window 51, regardless of flow direction, accordingly includes a reduction in cross-sectional flow area followed by an increase in cross-sectional flow area when passing between the first flow path 11 and the first compartment 52 via the first window 51.

The first compartment 52 is shown as having a substantially rectangular cuboid shape, but alternative shapes may be utilized in housing the heat sink 42 while remaining within the scope of the present invention. The first window 51 is also shown as having a substantially rectangular cross-sectional shape, but alternative cross-sectional shapes may be utilized while remaining within the scope of the present invention.

The second compartment 54 is defined by a first lateral wall 71, a second lateral wall 72 intersecting the first lateral wall 71 adjacent the position occupied by the partitioning wall 9, a rear wall 73 connecting the lateral walls 71, 72 at a position downstream of the partitioning wall 9, a second separating wall 62 forming a lower surface of the second compartment 54, and a third separating wall 63 forming an upper surface of the second compartment 54. The first lateral wall 71 separates the second compartment 54 from the first flow path 11, and accordingly defines at least a portion of the first flow path 11 opposite the second compartment 54. Likewise, the second lateral wall 72 separates the second compartment 54 from the second flow path 12, and accordingly defines at least a portion of the second flow path 12 opposite the second compartment 54. The second separating wall 62 may be disposed on substantially the same plane as the first separating wall 61, and may in fact be an extension of the first separating wall 61 beyond the first lateral wall 71. The second and third separating walls 62, 63 may also form outer walls of the secondary housing 4.

The first lateral wall 71 may be arranged at an incline relative to the longitudinal and lateral directions for directing the flow of the air through the first flow path 11 outwardly laterally for entry into a portion of the secondary housing 4 housing the corresponding blower wheel 36 of the blower assembly 35. The second lateral wall 72 may similarly be arranged at an incline relative to the longitudinal and lateral directions for directing the flow of the air through the second flow path 12 outwardly laterally for entry into a portion of the secondary housing 4 housing the corresponding blower wheel 37 of the blower assembly 35. The lateral walls 71, 72 may be oppositely inclined when extending away from the intersection therebetween to cooperate with the rear wall 73 in forming a substantially triangular cross-sectional shape of the second compartment 54.

The rear wall 73 extends downwardly beyond the second separating wall 72 to provide one of the side walls defining a rearward surface of the first compartment 52. The rear wall 73 is arranged adjacent a position of the actuator 38 of the blower assembly 35. The second compartment 54 may accordingly be said to be positioned adjacent and in front of the blower assembly 35 when the arrows 17, 18 correspond to a rearward direction of the vehicle.

The second compartment 54 is spaced apart from the first flow path 11 with respect to a direction transverse to the direction of the arrow 17. Specifically, the second compartment 54 may be spaced apart from the first flow path 11 with respect to the perpendicular arranged lateral direction. The second compartment 54 is also spaced apart from the second flow path 12 with respect to a direction transverse to the direction of the arrow 18. Specifically, the second compartment 54 may be spaced apart from the second flow path 12 with respect to the perpendicular arranged lateral direction. The second compartment 54 may accordingly be described as being disposed between the first flow path 11 and the second flow path 12 with respect to a direction arranged transverse to each of the arrows 17, 18, which may correspond to the lateral direction arranged perpendicular to each of the arrows 17, 18.

Figure 4:
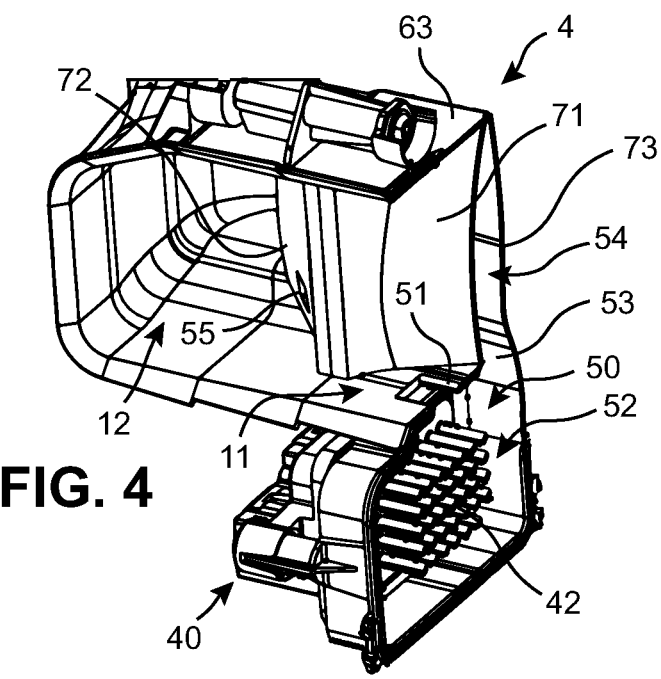
FIG. 4 is a fragmentary perspective cross-sectional view of a relevant portion of the rear housing of FIG. 2 with the illustrated cross-section taken from the perspective of section lines 4-4 in FIG. 2.
Figure 5:
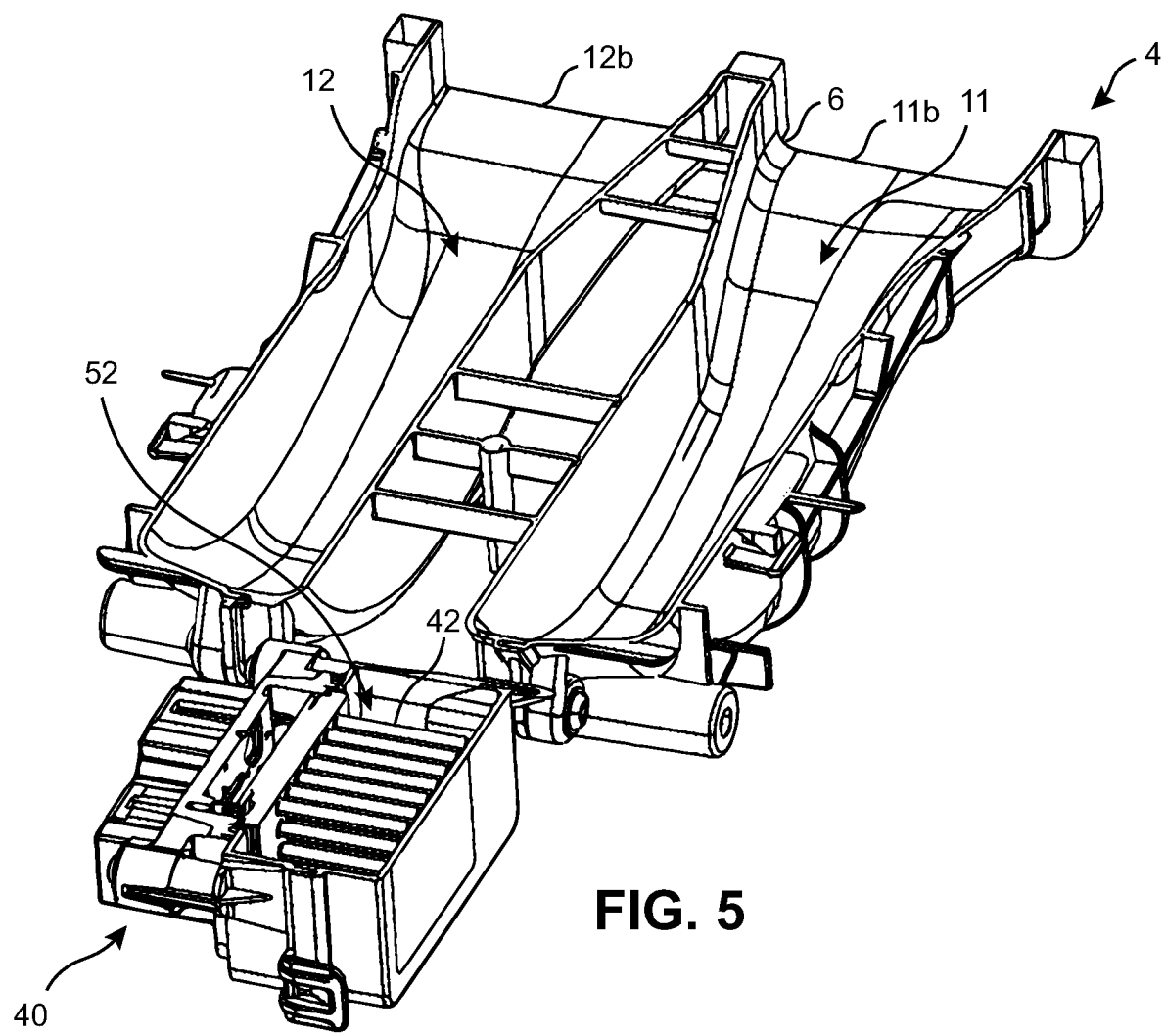
FIG. 5 is a perspective cross-sectional view of the rear housing with the illustrated cross-section taken from the perspective of section lines 5-5 in FIG. 3.
Figure 6:
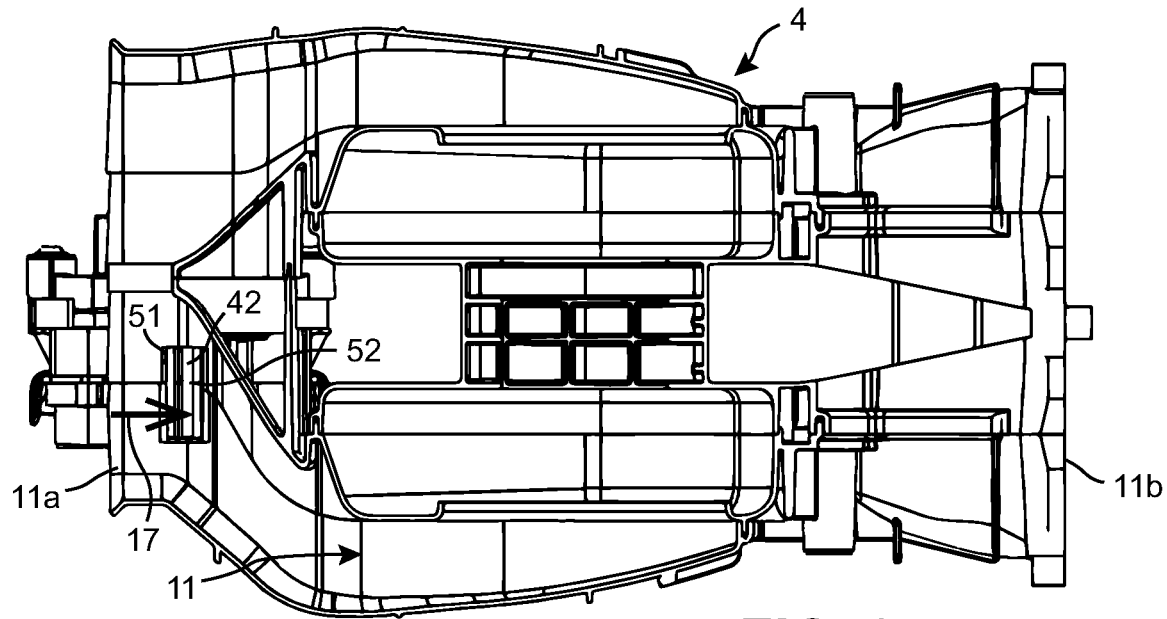
FIG. 6 is a top cross-sectional view of the rear housing with the illustrated cross-section taken from the same perspective as FIG. 3, wherein a first mode of operation including a first flow of air passing through a first flow path is shown.
Figure 7:
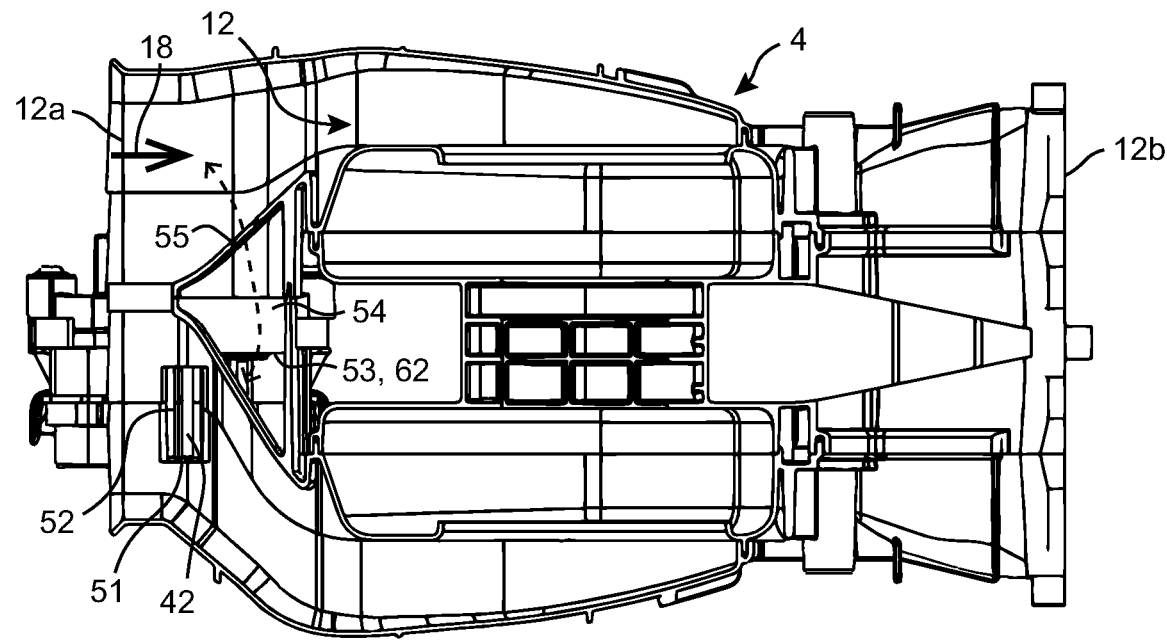
FIG. 7 is a top cross-sectional view of the rear housing with the illustrated cross-section taken from the same perspective as FIG. 3, wherein a second mode of operation including a second flow of air passing through a second flow path is shown.

As can best be seen by review of FIGS. 4, 6, and 7, the connecting passage 53 is formed by a vertically extending opening present between the first compartment 52 and the second compartment 54 along the plane defined by the first and second separating walls 61, 62. Specifically, the connecting passage 53 is defined by a segment of the first lateral wall 71, a segment of the rear wall 73, and an edge of the second separating wall 62 (as can be seen in FIGS. 6 and 7). The described surfaces form a substantially triangular cross-sectional shape of the connecting passage 53, as can be seen by the views shown in FIGS. 6 and 7. However, alternative cross-sectional shapes may be utilized while remaining within the scope of the present invention.

Any air flowing through the first compartment 52 between the first window 51 and the connecting passage 53 may flow at least partially in a direction parallel to the direction of arrow 17 for passing to either side of the first lateral wall 71. Any air flowing through the connecting passage 53 between the first compartment 52 and the second compartment 54 may flow at least partially in a direction transverse to the direction of arrow 17, which may correspond to the perpendicular arranged vertical direction, when passing from a first side of each of the separating walls 61, 62 to a second side of each of the separating walls 61, 62.

As can best be seen by comparison of the views of FIGS. 4-7, the connecting passage 53 has a smaller cross-sectional flow area therethrough than the first compartment 52 at a position immediately adjacent the connecting passage 53 or the second compartment 54 immediately adjacent the connecting passage 53. A passage of air through the connecting passage 53, regardless of flow direction, accordingly includes a reduction in cross-sectional flow area followed by an increase in cross-sectional flow area when passing between the first compartment 52 and the second compartment 54 via the connecting passage 53.

The second window 55 is formed through the second lateral wall 72 and is arranged wherein a flow of the air passing between the second flow path 12 and the second compartment 54 flows in a direction transverse to the direction of the arrow 18. More specifically, the flow of air may flow in a direction perpendicular to the direction of the arrow 18, which may correspond to the lateral direction. As can be seen by comparison of the views of FIGS. 2 and 3, the second window 55 has a smaller cross-sectional flow area therethrough than the second flow path 12 immediately adjacent the second window 55 or the second compartment 54 immediately adjacent the second window 55. A passage of air through the second window 55, regardless of flow direction, accordingly includes a reduction in cross-sectional flow area followed by an increase in cross-sectional flow area when passing between the second compartment 54 and the second flow path 12 via the second window 55.

The second window 55 is shown as having a substantially rectangular cross-sectional flow shape, but the second window 55 may have any flow shape while remaining within the scope of the present invention.

FIGS. 6 and 7 illustrate two different modes of operation of the air-handling system 1 that may be accommodated by the heat exchange passageway 50 for attaining desired heat exchange between the heat sink 42 and one or both of the flows of air associated with the first and second flow paths 11, 12.

FIG. 6 illustrates a mode of operation wherein the first flow of air is passing through the first flow path 11 from the inlet 11*a* to the outlet 11*b*, whereas the second flow path 12 does not include the second flow of air flowing therethrough. The mode of operation illustrated in FIG. 6 may be indicative of a circumstance in which a passenger would like the zone associated with the vents 21, such as the driver side rear seat zone, to receive a stream of conditioned air without another independently conditioned stream of air being delivered through the vents 22 to the adjacent zone, such as the passenger side rear seat zone. Such a circumstance may include the blower wheel 36 associated with the first flow path 11 operating at a greater rotational speed than the blower wheel 37 associated with the second flow path 12, which may in some circumstances not rotate at all in reaction to the described mode of operation. The mode of operation may also include certain distribution or mode control doors 29 disposed elsewhere in the housing 2 or certain vents 22 disposed downstream of the secondary housing 4 being adjusted to closed (or venting) positions to prevent air flow to the second flow path 12, or to prevent air-flow beyond what would be considered a vent or bleed of air flow. It is accordingly understood that the mode of operation shown in FIG. 6 corresponds to relatively stagnant air being disposed within the second flow path 12 while the first flow of air passes freely through the first flow path 11 at a desired flow rate. It should also be understood that prior to the initiation of the first flow of air passing through the first flow path 11, the air disposed within the heat exchange passageway 50 may also be substantially stagnant.

As shown by the position of the arrow 17 within the first flow path 11, at least a portion of the first flow of air passes directly over the first window 51 at an orientation substantially parallel to the plane of the first window 51 and perpendicular to a cross-sectional flow area therethrough, thereby preventing direct flow of the first flow of air into the first window 51 and over the heat sink 42. The passage of the first flow of air through the first flow path 11 leads to a relatively low amount of fluid exchange occurring between the air disposed in the heat exchange passageway 50 and the first flow path 11 via the first window 51. This slight degree of disturbance of the air within the heat exchange passageway 50 causes a sufficient flow of air over the heat sink 42 within the first compartment 52 to cool the heat sink 42 to a desired extent.

The disclosed configuration of the heat exchange passageway 50 prevents an undesired flow of the first flow of air through the heat exchange passageway 50 for passage through the second flow path 12 without requiring the use of a control door or valve within the heat exchange passageway 50. Specifically, the heat exchange passageway 50, regardless of whether flow is occurring from the first flow path 11 to the second flow path 12 or from the second flow path 12 to the first flow path 11 therethrough, is configured to include at least three different 90° changes of direction of the air within the heat exchange passageway 50, in addition to another 90° change of direction when entering one of the windows 51, 55. These changes in direction reduce a pressure of the air when flowing along the heat exchange passageway 50 in either of the described flow directions, thereby minimizing an impact of the pressure difference between the first flow path 11 and the second flow path 12 in undesirably affecting the flow of air through the unused second flow path 12.

Additionally, any such flow through the heat exchange passageway 50 includes a repeating pattern of cross-sectional flow area reduction when entering one of the windows 51, 55, followed by a cross-sectional flow increase when entering one of the compartments 52, 54, followed by cross-sectional flow reduction when entering the connecting passage 53, followed by a cross-sectional flow increase when entering the other of the compartments 52, 54, followed by a cross-sectional flow reduction when entering the other of the windows 51, and finally another cross-sectional flow increase when the air reaches the other of the flow paths 11, 12. This alternating pattern of flow reductions and increases also leads to a drop in the pressure of the air passing through such a flow path, thereby similarly preventing undesired air flow between the flow paths 11, 12. The relatively small cross-sectional flow area through each of the windows 51, 55 in comparison to the total flow area through either of the flow paths 11, 12 also prevents an undesirably large distribution of the air passing through either of the flow paths 11, 12 from being distributed to one of the windows 51, 55 for passage through the heat exchange passageway 50, thereby further preventing an undesirably large amount of cross-flow between the flow paths 11, 12.

Referring now to FIG. 7, the second flow path 12 includes the second flow of air passing therethrough as indicated by the arrow 18 while the first flow path 11 does not include the passage of the first flow of air therethrough. The mode of operation shown in FIG. 7 may correspond to the blower wheel 37 operating while the blower wheel 36 does not, or may include the blower wheel 37 operating at a much greater rotational rate than the blower wheel 36, as the circumstances dictate. The mode of operation shown in FIG. 7 may also correspond to certain distribution or mode control doors 29 disposed along the first flow path 11 or certain vents 21 disposed downstream of the first flow path 11 being closed to prevent flow through the second flow path 12, or to prevent flow beyond what would be considered a venting or bleeding of air.

The second flow of the air passing through the second flow path 12 causes a relatively small amount of fluid exchange to occur between the first flow path 12 and the heat exchange passageway 50 via the second window 52. As shown by the dashed line in FIG. 7, a flow of air may be initiated along the heat sink 42 within the first compartment 52 via the fluid communication provided between the second flow path 12 and the first compartment 52 via the second window 55, the second compartment 54, and the connecting passage 53. The air flow generated within the heat exchange passageway 53 is configured to be sufficient to cool the heat sink 42 to a desired degree.

The mode of operation shown in FIG. 7 accordingly includes a desired cooling of the heat sink 42 while still appreciating the benefits of the heat exchange passageway 50 in preventing cross-flow between the flow paths 11, 12. Specifically, the heat exchange passageway 50 is provided with substantially symmetric features regarding the necessary changes in direction and flow increases/reductions when progressing in either direction between the flow paths 11, 12, hence similar pressure losses are induced within the air regardless of the flow direction through the heat exchange passageway 50. The heat sink 42 requires a relatively low degree of air flow thereover to achieve the desired heat exchange, hence the positioning of the heat sink 42 within the distally arranged first compartment 52 (relative to the second flow path 12) does not prevent the adequate cooling of the heat sink 42 following the described reduction in air pressure along the heat exchange passageway 50.

The air-handling system 1 may also be operable wherein each of the first flow of air passes through the first flow path 11 and the second flow of air passes through the second flow path 12. Such a mode of operation may include a combination of the flow circumstances described hereinabove, wherein a relatively small degree of fluid exchange occurs at each of the windows 51, 55 for creating a desired air flow over the heat sink 42. The described pressure dropping features of the heat exchange passageway 50 also prevent a undesirable degree of cross-flow between the flow paths 11, 12 when a pressure difference is established between the flow paths 11, 12.

The heat sink 42 as used in conjunction with the LPM 40 may only be expected to increase the temperature of either of the flows of air through the flow paths 11, 12 by less than one degree Fahrenheit, hence the heating effects of the heat sink 42 may be considered to be negligible in attaining the desired temperature settings at each of the sets of vents 21, 22.

The described heat exchange passageway 50 accordingly provides the ability to adequately cool the heat sink 42 without negatively affecting the flow of air through either of the flow paths 11, 12, regardless of the mode of operation of the air-handling system 1 utilizing the LPM 40. The described configuration prevents a circumstance wherein only one of the flow paths 11, 12 is in fluid communication with the heat sink 42 such that flow conditions are significantly different between the two flow paths 11, 12 in a manner that must be accommodated structurally. Instead, each of the flow paths 11, 12 can be arranged similarly while accommodating a desired packaging of the LPM 40 and heat sink 42 relative to the flow paths 11, 12. The described heat exchange passageway 50 also includes a portion formed by the second compartment 54 that is disposed to be directly between the first and second flow paths 11, 12 while also disposed adjacent the blower assembly 35. The disclosed configuration allows for a tight packaging of the secondary housing 4 to accommodate limited space within the vehicle.

The invention is described herein as being suitable for use in a secondary housing 4 disposed downstream of a conditioning section of another primary housing 3 such that an auxiliary blower assembly is required, but it should be apparent that the present invention may be utilized in alternative circumstances where there is a need for cooling of a heat sink without negatively affecting two different flows of air associated with the heat sink. For example, the heat sink may be associated with a different electronic component in need of cooling, and is not limited to cooling the LPM 40. The flow paths 11, 12 may also be provided as any position within the air-handling system 1, and are not limited to being associated with certain zones of the vehicle. It should generally be understood that the beneficial features of the invention described herein may be appreciated in any circumstance wherein the relationships described herein are present, regardless of the specific application.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air-handling system for a vehicle comprising:
   a housing having an interior defining:
      a first flow path through which a first flow of air is configured to selectively flow towards a passenger compartment of the vehicle disposed exterior to the housing, wherein the first flow of air is directed towards a first zone of the passenger compartment of the vehicle by way of the first flow path;
      a second flow path through which a second flow of air is configured to selectively flow towards the passenger compartment of the vehicle, wherein the second flow of air is directed towards a second zone of the passenger compartment of the vehicle by way of the second flow path;
      a heat exchange passageway providing fluid communication between the first flow path and the second flow path within the interior of the housing; and
   a heat sink disposed within the heat exchange passageway, the heat sink configured to exchange heat with air flowing through the heat exchange passageway when flowing between the first flow path and the second flow path.

2. The air-handling system of claim 1, wherein the heat exchange passageway includes a first compartment and a first window, wherein the first window provides fluid communication between the first flow path and the first compartment.

3. The air-handling system of claim 2, wherein air passing between the first flow path and the first compartment through the first window flows in a direction transverse to a direction of flow of the first flow of air.

4. The air-handling system of claim 2, wherein a flow of air flowing between the first compartment and the first flow path experiences a cross-sectional flow reduction when passing through the first window.

5. The air-handling system of claim 2, wherein the heat sink is disposed within the first compartment.

6. The air-handling system of claim 2, wherein the heat exchange passageway further includes a second compartment and a second window, wherein the second window provides fluid communication between the second flow path and the second compartment.

7. The air-handling system of claim 6, wherein the heat exchange passageway further includes a connecting passage providing fluid communication between the first compartment and the second compartment.

8. The air-handling system of claim 7, wherein the heat sink is disposed within the first compartment.

9. The air-handling system of claim 1, wherein the first flow of air is directed towards a first set of vents associated with the first zone of the passenger compartment of the vehicle, and wherein the second flow of air is directed towards a second set of vents associated with the first zone of the passenger compartment of the vehicle.

10. The air-handling system of claim 1, wherein a flow of air flowing from the first flow path to the second flow path through the heat exchange passageway includes at least three different 90° changes of direction.

11. The air-handling system of claim 1, wherein a flow of air flowing from the first flow path to the second flow path through the heat exchange passageway encounters, in listed order, a first reduction in cross-sectional flow area of the heat exchange passageway, a first increase in cross-sectional flow area of the heat exchange passageway, and a second reduction in cross-sectional flow area of the heat exchange passageway.

12. The air-handling system of 11, wherein the heat sink is encountered by the flow of air after the flow of air encounters the first increase in cross-sectional flow area.

13. The air-handling system of 11, wherein the flow of air further encounters, in order after the second reduction in cross-sectional flow area of the heat exchange passageway, a second increase in cross-sectional flow area of the heat exchange passageway and a third reduction in cross-sectional flow area.

14. The air-handling system of claim 1, wherein the heat sink is configured to remove heat from an electronic component.

15. The air-handling system of claim 14, wherein the electronic component is a linear power module (LPM) associated with a blower assembly of the air-handling system.

16. The air-handling system of claim 1, wherein a portion of the heat exchange passageway extends to a position directly between the first flow path and the second flow path.

17. The air-handling system of claim 16, wherein the heat sink is not disposed within the portion of the heat exchange passageway directly between the first flow path and the second flow path.

18. The air-handling system of claim 1, wherein the heat sink is not directed directly encountered by either of the first flow of air within the first flow path or the second flow of air within the second flow path.

19. The air-handling system of claim 1, wherein the first flow path is in fluid communication with a first blower wheel of a blower assembly and the second flow path is in fluid communication with a second blower wheel of the blower assembly.

20. The air-handling system of claim 19, wherein the first blower wheel and the second blower wheel are configured to be operable independently of each other to cause a flow rate of the first flow of air to be different from a flow rate of the second flow of air.

* * * * *